United States Patent
Oberheide

[19]

[11] Patent Number: 5,877,573
[45] Date of Patent: *Mar. 2, 1999

[54] D.C. MOTOR AND REVERSING CIRCUIT

[75] Inventor: G. Clarke Oberheide, Troy, Mich.

[73] Assignee: Siemens Electric Limited, Mississauga, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 898,310

[22] Filed: Jul. 22, 1997

[51] Int. Cl.$^6$ .......................... H02K 23/02; H02K 23/36
[52] U.S. Cl. .......................... 310/180; 310/239; 310/50; 318/292
[58] Field of Search .......................... 310/177, 50, 180, 310/184, 238, 239; 318/292

[56] References Cited

U.S. PATENT DOCUMENTS

| | | | |
|---|---|---|---|
| 1,907,831 | 5/1933 | Kongsted | 310/138 |
| 2,888,622 | 5/1959 | Mooers | 318/357 |
| 3,184,627 | 5/1965 | Sears | 310/137 |
| 3,466,482 | 9/1969 | Peters | 310/269 |
| 3,641,409 | 2/1972 | Maeda et al. | 318/258 |
| 3,699,418 | 10/1972 | Sasabe et al. | 318/325 |
| 4,095,155 | 6/1978 | Brooks et al. | 318/541 |
| 4,454,454 | 6/1984 | Valentine | 318/293 |
| 4,596,159 | 6/1986 | Hamano et al. | 310/248 X |
| 4,728,876 | 3/1988 | Mongeon et al. | 310/50 X |
| 4,910,790 | 3/1990 | Kershaw | 388/836 |
| 4,997,237 | 3/1991 | Ricker et al. | 310/115 |
| 5,734,240 | 3/1998 | Janca et al. | 318/280 |

OTHER PUBLICATIONS

Gerald Schweitzer, Basics of Fractional Horsepower Motors and Repair, 11 th ed., 1960, p. 29 (month unknown).

Peter A. Kershaw & G. Clarke Oberheide, Improved Fan Speed Control for A/C Condenser and Engine Cooling Systems, SAE Tech. Paper No. 910645, 1991. (month unknown).

*Primary Examiner*—Steven L. Stephan
*Assistant Examiner*—Judson H. Jones

[57] ABSTRACT

A D.C. motor and an associated switch circuit for selecting between forward and reverse motor rotation about a motor axis. Two armature winding portions are disposed on an armature core, A magnetic flux source on the stator provides magnetic flux across an air gap for interaction with these winding portions. One winding portion, when energized, causes armature rotation in a forward sense; the other winding portion, when energized, causes armature rotation in a reverse sense. The associated switch circuit contains first circuit branch, including a first selectively operable switch, connected via certain brushes and commutator to include the one winding portion, and a second circuit branch, including a second selectively operable switch, connected via certain brushes and commutator to include the other winding portion. Operation of the first switch to closed position energizes the one winding portion to cause forward rotation; operation of the second switch to closed position energizes the other winding portion to cause reverse rotation.

15 Claims, 3 Drawing Sheets

5,877,573

D.C. MOTOR AND REVERSING CIRCUIT

FIELD OF THE INVENTION

This invention relates generally to D.C. electric motors and associated switch circuits for operating such motors, and more particularly to novel D.C. electric motors and associated switch circuits for selecting forward and reverse motor rotation.

BACKGROUND AND SUMMARY OF THE INVENTION

Certain uses of D.C. motors require that a motor be capable of operating in both a forward rotational sense and in a reverse totational sense, with the desired sense of rotation being selected by the appropriate operation of switches, Examples of such uses are power windowlift motors and power seat motors for automotive vehicles.

An example of one D.C. motor type is a bifilar wound field type that is operable in a desired sense by selecting a particular one of two inputs. Each input contains a respective on-off switch. When one switch is operated closed while the other remains open, a respective magnetic field is created causing forward motor rotation. When the other switch is operated closed while the one remains open, a respective magnetic field is created causing reverse motor rotation. Although only two switches are required in this example, their current-carrying capacity must necessarily be increased as the current rating of the motor is increased. The cost of such higher-current switches may increases in relation to motor cost in a way that decreases the cost-effectiveness of the motor and the associated switch curcuit.

Another type of D.C. motor and associated switch circuit that provides bi-directional motor rotation is a permanent magnet D.C. motor connected to an "H" bridge switch circuit, The "H" bridge comprises four switches, two connected to one motor terminal and two connected to the other motor terminal. The switches are operated in a manner to cause the armature current to flow in either a forward direction or a reverse direction, thereby causing forward or reverse motor rotation. Although a permanent magnet D.C. motor may afford certain advantages, its association with an "H" bridge circuit that contains four switches in order to endow it with a bi-directional rotational capability may, as in the preceding example, result in decreased cost-effectiveness for the motor and associated switch circuit as current-carrying requirements increase.

Cost-effectiveness may be a significant factor in mass-production of such motors and curcuit, especially for automotive usage, as in the exemplary power windowlift and power seat uses mentioned above.

The present invention relates to novel D.C. electric motors and associated switch circuits for selecting forward and reverse motor rotation. In certain uses, such motors and circuits may offer opportunities for better cost-effectiveness in comparison to other motors and circuits in these same uses.

The foregoing, along with further features, advantages, and benefits of the invention, will be disclosed in, and perceived by the reader from, the following detailed description of a presently preferred embodiment of the invention representing the best mode contemplated at this time for carrying out the invention. The disclosure is accompanied by drawings, described briefly as follows.

DESCRIPTION OF THE PREFERRED EMBODIMENT

Figure 1:
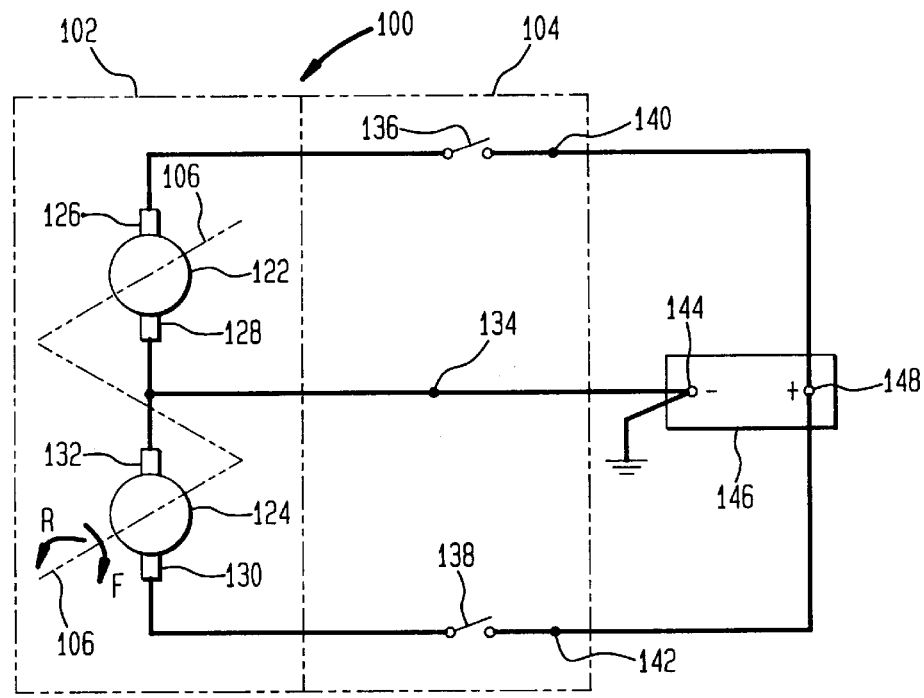
FIGS. 1 and 1A are schematic diagrams representative of a first embodiment of the invention.
Figure 1A:
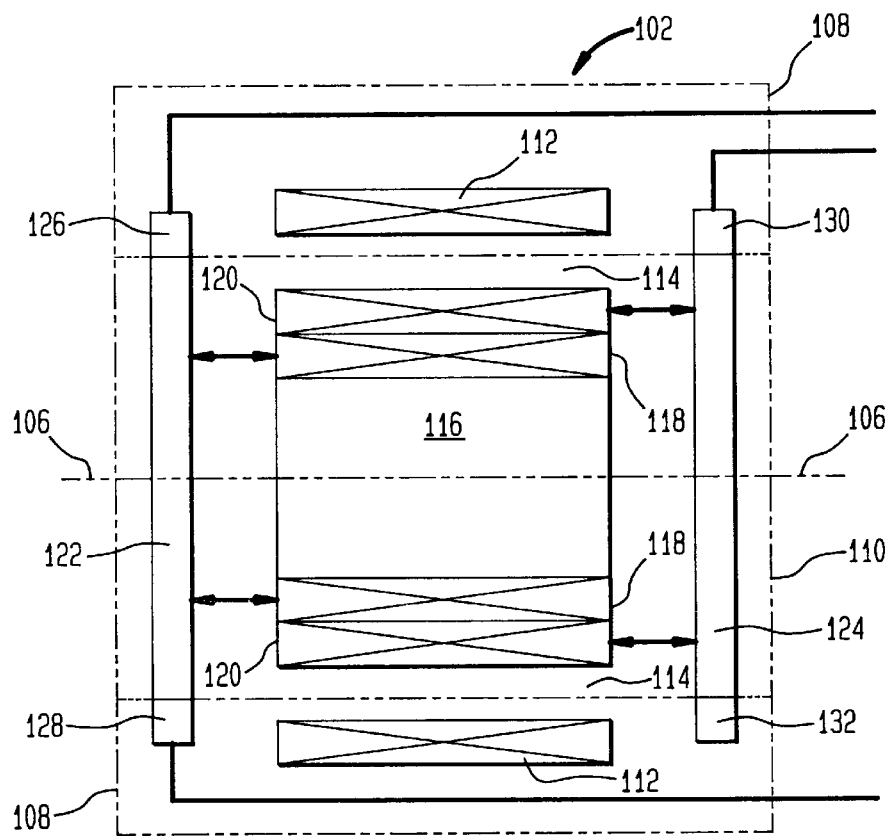

FIGS. 1 and 1A disclose a first embodiment 100 of D.C. motor 102 and associated switch circuit 104 for establishing the sense of motor rotation about a motor axis 106. D.C. motor 102 is a type that is sometimes referred to as a permanent magnet motor (PM motor) and comprises a stator 108 and an armature 110. A permanent magnet structure 112 in disposed on stator 108 for providing magnetic flux across an air gap 114 between stator 108 and armature 110.

Armature 110 (including a shaft not specifically shown) is suitably journaled for rotation about motor axis 106 and comprises a ferromagnetic armature core 116 on which a pair of independent armature winding portions 118, 120 are commonly disposed in any known manner. Armature 110 further comprises two commutators 122, 124, each respectively connected with a respective armature winding portion 118, 120 in a known fashion. Winding portion 118 is wound on core 116 in a manner for interaction with the pattern of magnetic flux provided by permanent magnet structure 112 that causes forward rotation of armature 110 when current is delivered to this winding portion via commutator 122. Winding portion 120 is wound on core 116 in a manner for interaction with the pattern of magnetic flux provided by permanent magnet structure 112 that causes reverse rotation of armature 110 when current is delivered to this winding portion via commutator 124. In FIG. 1, forward sense of rotation is represented by the arrow F, and reverse sense by the arrow R.

Also disposed on stator 108 are two pairs of brushes. One brush pair 126, 128 engages commutator 122, while the other brush pair 130, 132 engages commutator 124. The brushes of each pair arc disposed diametrically opposite each other about motor axis 106. Internal of motor 102, brushes 128, 132 are connected in common; externally, their common connection leads to a termination 134 of switch circuit 104. Each brush 126, 130 is respectively connected through a respective on-off switch 136, 138 of switch circuit 104 to a respective termination 140, 142 of switch circuit 104. Termination 134 is connected to one terminal 144 (shown by example as grounded) of a D.C. voltage supply 146 while terminations 140, 142 are connected to another (ungrounded) terminal 148 (shown by example as positive) of voltage supply 146.

When switch 136 is operated closed while switch 138 remains open, the D.C. voltage across terminals 148, 144 is delivered via commutator 122 to winding portion 118 causing that portion to be energized by electric current flow. The interaction of this current flow with the magnetic flux pattern of permanent magnet structure 112 causes armature, 110 to rotate in a forward sense.

When switch 138 is operated closed while switch 136 remains open, the D.C. voltage across terminals 148, 144 is delivered via commutator 124 to winding portion 120 causing that portion to be energized by electric current flow. The interaction of this current flow with the magnetic flux pattern of permanent magnet structure 112 causes armature 110 to rotate in a reverse sense.

In the FIG. 1, 1A embodiment, it is to be noticed that the permanent magnet structure and the ferromagnetic armature core are fully (meaning essentially 100%) utilized both during forward armature rotation and during reverse armature rotation.

Figure 2:
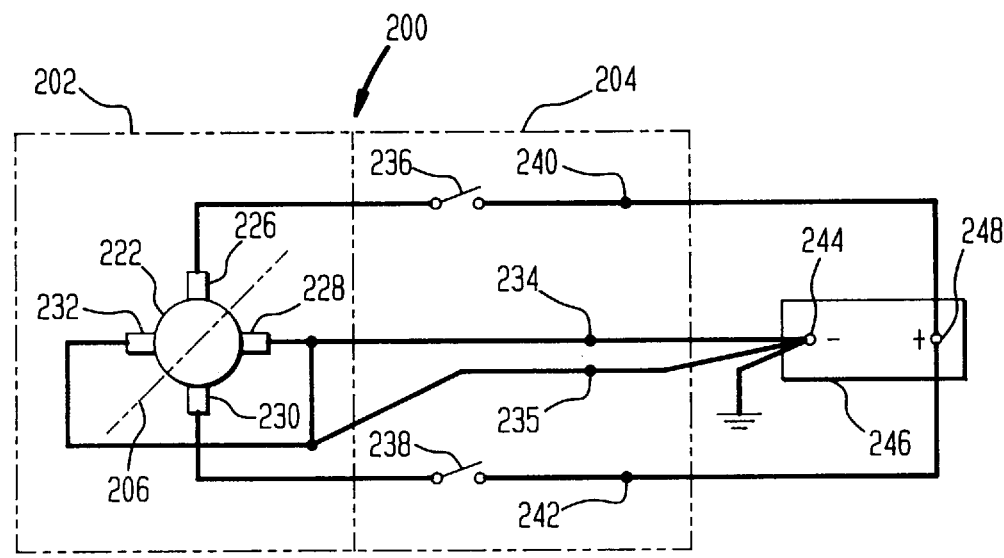
FIGS. 2 and 2A are schematic diagrams representative of a second embodiment of the invention.
Figure 2A:
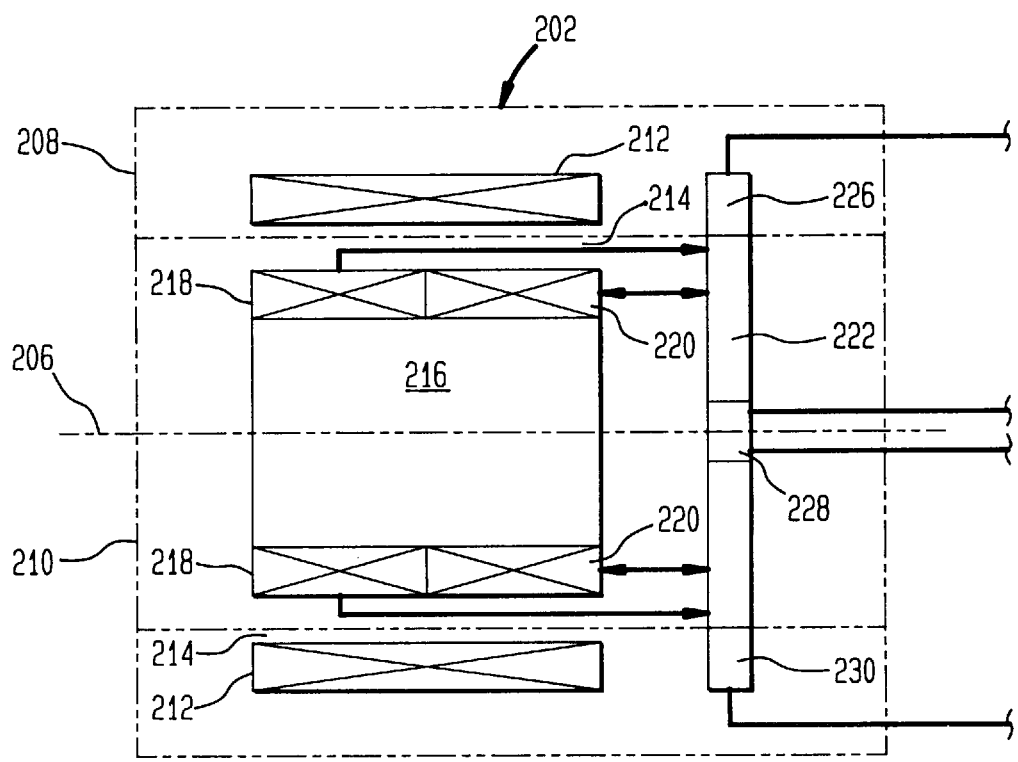

FIGS. 2 and 2A disclose a second embodiment 200 of D.C. motor 202 and associated switch circuit 204 for establishing the sense of motor rotation about a motor axis 206. D.C. motor 202 is a PM motor that comprises a stator 208 and an armature 210. A permanent magnet structure 212 is disposed on stator 208 for providing magnetic flux across an air gap 214 between stator 208 and armature 210.

Armature 210 (including a shaft not specifically shown) is suitably journaled for rotation about motor axis 206 and comprises a ferromagnetic armature core 216 on which a center-tapped armature winding is disposed in a known manner to provide respective winding portions 218, 220 on respective portions of core 216. Armature 210 comprises a single commutator 222 having appropriate connections with winding portions 218, 220. Winding portion 218 is wound on one portion of core 216 in a manner for interaction with the magnetic flux pattern provided by one portion (essentially one half) of permanent magnet structure 212 for causing forward rotation of armature 210 when current is delivered to this winding portion via commutator 222. Winding portion 220 is wound on another portion of core 216 in a manner for interaction with the magnetic flux pattern provided by another portion (essentially the other half) of permanent magnet structure 212 that causes reverse rotation of armature 210 when current is delivered to the winding portion via commutator 222.

Also disposed on stator 208 at 90° intervals around commutator 222 and axis 206 are four brushes 226, 228, 230, 232. Brushes 226, 228 form one brush pair, while brushes 230, 232 form another pair. Brushes 228, 232 are connected in common, either internal or external (or both) of the motor (brush 232 being obscured from view in FIG. 2A by commutator 222). FIG. 2 shows both a common internal connection at certain common connections of winding portions 218, 220 to appropriate connection points of commutator 222 and a common external connection where two terminations 234, 235 of switch circuit 204 commonly connect at one terminal 244 (shown by example as grounded) of a D.C. voltage supply 246. Each brush 226, 230 is respectively connected through a respective on-off switch 236, 238 of switch circuit 204 to a respective termination 240, 242 of circuit 204. Terminations 240, 242 are connected to another terminal 248 (shown by example as positive) of voltage supply 246.

When switch 236 is operated closed while switch 238 remains open, the D.C. voltage across terminals 248, 244 is delivered via commutator 222 to winding portion 218 causing that winding portion to be energized by electric current flow. The interaction of this current flow with the magnetic flux pattern of the corresponding portion of permanent magnet structure 212 causes armature 210 to rotate in a forward sense.

When switch 238 is operated closed while switch 236 remains open, the D.C. voltage across terminals 248, 244 is delivered via commutator 222 to winding portion 220 causing that winding portion to be energized by electric current flow. The interaction of this current flow with the magnetic flux pattern of the corresponding portion of permanent magnet structure 212 causes armature 210 to rotate in a reverse sense.

In the FIGS. 2 and 2A embodiment, it is to be noticed that only a single commutator is required.

Figure 3:
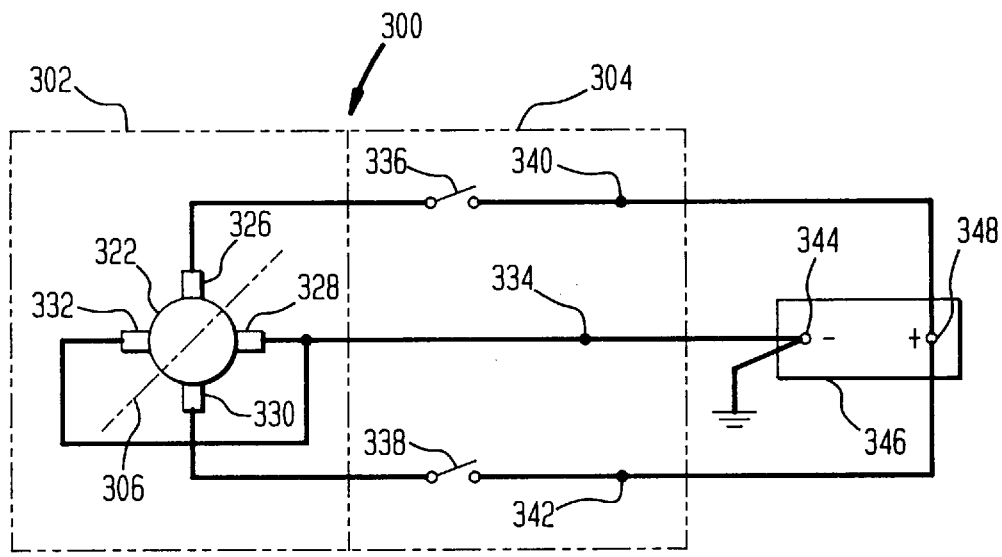
FIGS. 3 and 3A are schematic diagrams representative of a third embodiment of the invention.
Figure 3A:
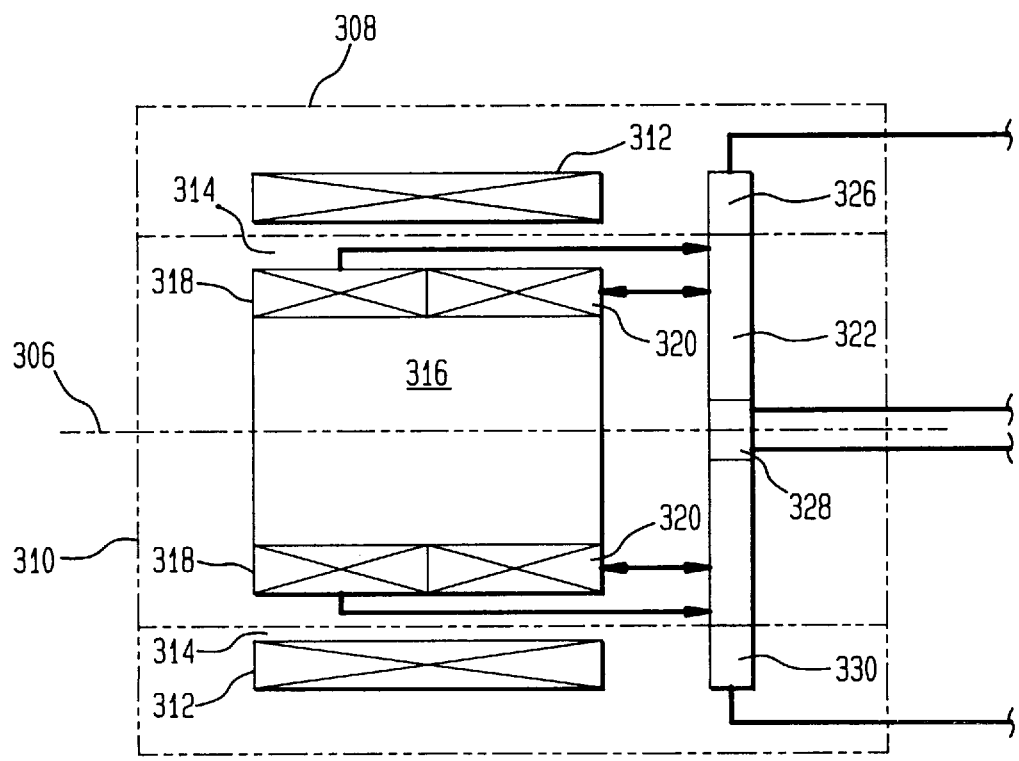

FIGS. 3 and 3A disclose a third embodiment 300 of D.C. motor 302 and associated switch circuit 304 for establishing the sense of motor rotation about a motor axis 306. D.C. motor 302 is a conventional four-polo PM motor that comprises a stator 308 and an armature 310. A permanent magnet structure 312 is disposed on stator 308 for providing magnetic flux across an air gap 314 between stator 308 and armature 310.

Armature 310 is suitably journaled for rotation about motor axis 306 and comprises a ferromagnetic armature core 316 on respective portions of which respective winding portions 318, 320 are disposed in a known manner. Armature 310 comprises a single commutator 322 having appropriate connections with winding portions 318, 320. Winding portion 318 is wound on one portion of core 316 in a manner for interaction with the magnetic flux pattern provided by one portion of permanent magnet structure 312 for causing forward rotation of armature 310 when current is delivered to this winding portion via commutator 322. Winding portion 320 is wound on another portion of core 316 in a manner for interaction with the magnetic flux pattern provided by another portion of permanent magnet structure 311 that causes reverse rotation of armature 310 when current is delivered to this winding portion via commutator 322.

Also disposed on stator 308 at 90° intervals around commutator 322 and axis 306 are four brushes 326, 328, 330, 332. Brushes 326, 328 form one brush pair, while brushes 330, 332 form another pair. Brushes 328, 332 are connected in common internal of the motor (brush 332 being obscured from view in FIG. 3A by commutator 322). FIG. 3 shows a common internal connection brought out externally to a termination 334 of switch circuit 304 which in turn connects to one terminal 344 (shown by example as grounded) of a D.C. voltage supply 346. Each brush 326, 330 is respectively connected through a respective on-off switch 336, 338 of switch circuit 304 to a respective termination 340, 342 of circuit 304. Terminations 340, 342 are connected to another terminal 348 (shown by example as positive) of voltage supply 346.

When switch 336 is operated closed while switch 338 remains open, the D.C. voltage across terminals 348, 344 is delivered via commutator 322 to winding portion 318 causing that winding portion to be energized by electric current flow. The interaction of this current flow with the corresponding portion of the magnetic flux pattern of permanent magnet structure 312 causes armature 310 to rotate in a forward sense.

When switch 338 is operated closed while switch 336 remains open, the D.C. voltage across terminals 348, 344 is delivered via commutator 322 to winding portion 320 causing that winding portion to be energized by electric current flow. The interaction of this current flow with the corresponding portion of the magnetic flux pattern of permanent magnet structure 312 causes armature 310 to rotate in a reverse sense.

In the FIG. 3 and 3A embodiment, it is to be noticed that only a single commutator is required.

While a presently preferred embodiment of the invention has been illustrated and described, it is to be appreciated that principles are applicable to other embodiments falling within the scope of the following claims.

What is claimed is:

1. An D.C. motor and an associated switch circuit for selecting between forward and reverse motor rotation about a motor axis comprising:

a D.C. motor comprising a stator and an armature, said armature comprising two armature, winding portions disposed on an armature core, said stator comprising a magnetic flux source providing magnetic flux across an air gap between said stator and armature for interaction with said winding portions;

one of said winding portions comprising forward-rotation causing windings for causing rotation of said armature in a forward sense, the other of said winding portions comprising reverse-rotation-causing windings for causing rotation of said armature in a reverse sense;

commutator means disposed on said armature and connected with said winding portions;

first and second pairs of brushes disposed on said stator and engaging said commutator means for delivering electric current to said winding portions via said commutator means;

said associated switch circuit comprising a first circuit branch connected via said first pair of brushes and said commutator means to include said one winding portion and a second circuit branch connected via said second pair of brushes and said commutator means to include said other winding portion;

said first and second circuit branches each comprising a respective first termination and a respective second termination via which the respective circuit branch can he connected across a D.C. voltage supply, said second terminations being connected in common;

said first circuit branch comprising a first selectively operable switch connected between a first brush of said first pair of brushes and the first termination of said first circuit branch for selectively establishing and disestablishing continuity between said first termination of said first circuit branch and said first brush of said first pair of brushes; and said second circuit branch comprising a second selectively operable switch connected between a first brush of said second pair of brushes and the first termination of said second circuit branch for selectively establishing and disestablishing continuity between said first termination of said second circuit branch and said first brush of said second pair of brushes.

2. An D.C. motor and an associated switch circuit as set forth in claim 1 in which said commutator means comprises two independent commutators, one engaged by said first pair of brushes, and the other engaged by said second pair of brushes.

3. A D.C. motor and an associated switch circuit as set forth in claim 2 in which said first and second brushes of said first pair of brushes are disposed diametrically opposite each other about the motor axis, and said first and second brushes of said second pair of brushes are disposed diametrically opposite each other about the motor axis.

4. A D.C. motor and an associated switch circuit as set forth in claim 1 in which said second terminations have a common connection internal of the D.C. motor.

5. A D. C. motor and an associated switch circuit as set forth in claim 1 in which said winding portions are disposed on a common ferromagnetic portion of said armature core.

6. A D.C. motor and an associated switch circuit as set forth in claim 5 in which said magnetic flux source comprises a permanent magnet providing magnetic flux commonly for both said winding portions.

7. A D.C. motor and an associated switch circuit as set forth in claim 1 further including a D.C. voltage supply comprising a pair of terminals across which a D.C. voltage is provided, and in which said first terminations are connected to one of said pair of terminals of said D.C. voltage supply, and said commonly connected second terminations are connected to the other of said pair of terminals of said D.C. voltage supply.

8. A D.C. motor land an associated switch circuit as set forth in claim 1 in which said commutator means comprises a single commutator, engaged both by said first pair of brushes and by said second pair of brushes.

9. A D.C. motor and an associated switch circuit as set forth in claim 8 in which said first and second brushes of said first pair of brushes and said first and second brushes of said second pair of brushes are disposed at 90° intervals about the motor axis, and said first and second brushes of each pair are disposed 90° apart from each.

10. A D.C. motor and an associated switch circuit as set forth in claim 8 in which said second terminations have a common connection internal of the D.C. motor.

11. A D.C. motor and an associated switch circuit as set forth in claim 8 in which said second terminations have a common connection external of the D.C. motor.

12. A D.C. motor and an associated switch circuit as set forth in claim 8 in which said winding portions are disposed respectively on different respective ferromagnetic portions of said armature core.

13. A D.C. motor and an associated switch circuit as set forth in claim 12 in which said magnetic flux source comprises a first permanent magnet portion providing magnetic flux for said one winding portion, and a second permanent magnet portion providing magnetic flux for said other winding portion.

14. A D.C. motor and an associated switch circuit as set forth in claim 8 further including a D.C. voltage supply comprising a pair of terminals across which a D.C. voltage is provided, and in which said first terminations are connected to one of said pair of terminals of said D.C. voltage supply, and said commonly connected second terminations are connected to the other of said pair of terminals of said D.C. voltage supply.

15. A D.C. motor and an associated switch circuit for selecting between forward and reverse motor rotation about a motor axis comprising:

a D.C. motor comprising a stator and an armature, said armature comprising two armature winding portions disposed on an armature core, said stator comprising a magnetic flux source providing magnetic flux across an air gap between said stator and armature for interaction with said winding portions;

one of said winding portions comprising forward-rotation-causing windings for causing rotation of said armature in a forward sense, the other of said winding portions comprising reverse-rotation-causing windings for causing rotation of said armature in a reverse sense;

commutator means disposed on said armature and connected with said winding portions;

brushes disposed on said stator and engaging said commutator means for delivering electric current to said winding portions via said commutator means;

said associated switch circuit comprising a first circuit branch connected via certain of said brushes and said commutator means to include said one winding portion and a second circuit branch connected via certain of said brushes and said commutator means to include said other winding portion;

said first and second circuit branches comprising terminations via which the respective circuit branch can be connected across a D.C. voltage supply;

said first circuit branch comprising a first selectively operable switch connected between a first brush and one termination for selectively establishing and disestablishing a current flow path through said first circuit branch; and said second circuit branch comprising a second selectively operable switch connected between a second brush and another termination for selectively establishing and disestablishing a current flow path through said second circuit branch.

* * * * *